Nov. 18, 1930.  C. T. MASON  1,781,818

PRESSURE GAUGE

Filed Dec. 1, 1928

INVENTOR
CARL T. MASON

Patented Nov. 18, 1930

1,781,818

UNITED STATES PATENT OFFICE

CARL T. MASON, OF EAST ORANGE, NEW JERSEY, ASSIGNOR TO TIFFANY MANUFACTURING COMPANY, OF NEWARK, NEW JERSEY

PRESSURE GAUGE

Application filed December 1, 1928. Serial No. 323,109.

This invention relates to a fluid-pressure gauge and while adapted for various purposes, it is especially useful as an instrument on the dashboard of an automobile to indicate the oil pressure used in connection with the lubricating system of the engine. It is obvious of course, that the instrument may be used for other purposes wherever a pressure indicating instrument may be used.

In certain types of internal combustion engines, the pressure in the oil line or conduit is relatively high when the engine is cold and the lubricating fluid somewhat stiff, but on the other hand, the pressure in the feed line becomes relatively low when the engine and fluid get warmed up. Where such a condition exists, it is necessary to have an instrument which will register or at least will not be damaged by the high pressure, and one which is sensitive enough to register accurately the pressure in the oil feed line when the engine is hot.

It is therefore the principal object of my invention to provide an instrument which will meet these severe and extreme conditions. Another object of my invention is to provide a construction which while fulfilling the principal object of the invention, can be made very cheaply, yet rugged and substantial.

Other objects will be apparent after a study of the specification taken in connection with the annexed drawing, wherein:

Figures 1 and 2 are substantially twice the size of the commercial type of instrument.

Figure 1:
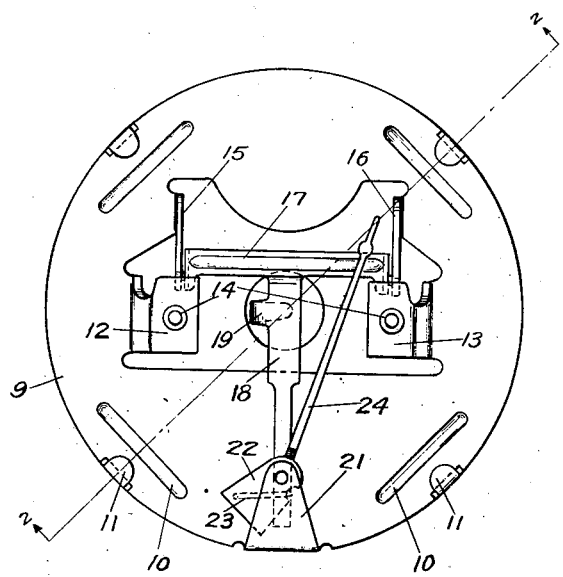
Figure 1 is a plan view of the instrument without its casing, and with the indicating finger moved a considerable distance from the zero position.

Certain of the parts of this instrument; namely, those relating to the indicating mechanism, are very similar to the corresponding parts shown in an application filed by Samuel C. McKeown on a fluid gauge, Serial No. 149,043, filed November 18, 1926, and no claims will be made to these particular details, but they are briefly described herein merely for the purpose of making my improvement of an instrument of this character clearly understood.

In the drawing, wherein like numbers refer to the corresponding parts in the various views, 1 is a casing or base member having a threaded nipple 2 securely fastened thereto. It is to be understood that the feed line or conduit is adapted to be attached to the nipple 2 which has a passage 3 opening into the base 1. Positioned within the base 1, is a compound diaphragm consisting of two parts. The inner part 4 is of very thin material preferably of a metal of suitable character, while the outer portion 5 is of a considerably thicker metal of a suitable character.

The two portions 4 and 5 of the compound diaphragm preferably have their edges turned over and fit within the inner periphery of the upturned annular flange 6 of the base 1. In addition, the periphery of the two parts 4 and 5 of the compound diaphragm are hermetically sealed at the edges as by soldering them at 7 to the flange 6. Preferably, the outer part 5 of the compound diaphragm has an annular rib 8 formed therein and resting on this strengthening rib 8 is a mounting plate 9 which has a plurality of ribs 10 formed therein which engage the annular rib 8. The mounting plate 9 is securely held in place by a plurality of ears 11 integral with the flange 6, which ears are bent downwardly over the outer edge of the mounting plate 9. The mounting plate 9 is provided with a pair of lugs 12 and 13 punched from the material of the plate 9. Attached to the lugs 12 and 13, are pins 14 which support a dial indicating plate not shown.

The plate 9 is also provided with lugs 15 and 16 formed integrally with the plate 9, between which lugs is pivotally mounted a cross-bar 17 of a lever 18. The lever 18 has a finger 19 formed integrally therewith and which is bent downward, passing through a hole 20 in the outer portion 5 of the compound diaphragm into engagement with the inner part 4 of the compound diaphragm. The mounting plate 9 also has another upturned lug 21 having its upper end bent over to form a support for a movable member 22 pivoted between the bent-over end of the lug 21 and the mounting plate 9. The movable member 22 is provided with a member 23 which is formed to act as a cam which is adapted to be engaged by the end of the lever 18 to turn the member 22 on its pivot points. An indicating finger 24 is carried by the movable member 22, so that the indicating finger 24 indicates on the dial scale held in place by the pins 14, the movement transmitted to it through the compound diaphragm. The part 22 is so constructed that when the pressure is removed from the diaphragm, the indicator 24 is returned to the left or zero position by gravity.

My improvement to an indicating instrument of this kind, resides in the compound diaphragm which is made up of the two parts 4 and 5 as described. Preferably, the part 4 which is made of relatively thin metal, is deformed, this deformation being indicated by a plurality of concentric ribs for the purpose of stiffening this part of the diaphragm and preventing its "snapping" like the bottom of an oil can. In other words, as pressure is applied to the compression chamber formed by the base 1 and the compound diaphragm through the passage 3 of the nipple 2, if part 4 is not properly constructed, it would be apt to "snap" back and forth like an oil can bottom, which would give a variable and jerky operation of the gauge.

Figure 2:
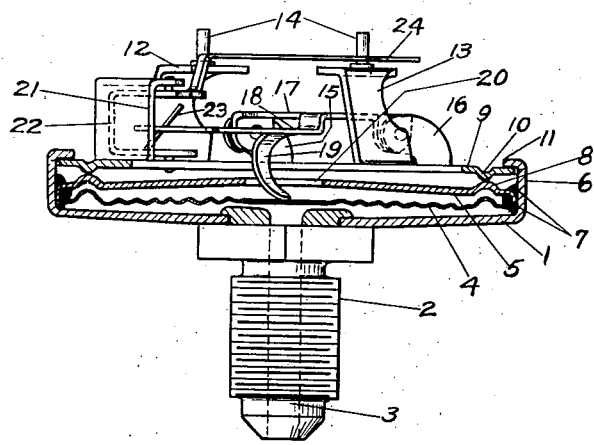
Figure 2 is a part elevation and part-sectional view on the line 2—2 of Figure 1.

In Figure 2 it will be seen that as the inner portion 4 of the thin part of the diaphragm is moved outwardly by pressure set up within the chamber, this diaphragm will engage the outer thicker portion 5 over the greater part of the area of both portions. Consequently, the outer portion 5 acts as a stop for the inner portion 4, thereby preventing the thin inner portion 4 from being distorted in any manner by the relatively high pressures which are set up at certain times as previously explained. When this high pressure is set up the inner thin diaphragm after engaging the outer thicker diaphragm 5, moves it a predetermined amount, but without any damage to the inner thin diaphragm, which is made so as to be sensitive and able to give an accurate indication of the low pressure in the feed line after the engine and lubricating fluid become hot.

It will thus be seen that I have provided an arrangement for taking care of the two extreme conditions without detrimental effect to the portions which are delicate enough to indicate the low pressure.

Having thus described my invention, what I claim is:

1. In a pressure gauge, a base member having means for attaching a pressure conduit thereto, a pair of movable diaphragms which at lower pressures are separated except at their peripheries which are fastened to the base member so as to form a compression chamber therewith, a mounting plate carried by the base, an indicating device and means carried on the mounting plate for connecting the indicating device in operative relation to one of said diaphragms.

2. In a pressure gauge, a base member having means for attaching a pressure conduit thereto, a pair of movable diaphragms which at lower pressures are separated except at their peripheries which are fastened to the base member so as to form a compression chamber therewith, the inner diaphragm being made thinner than the outer one and responsive to low pressure and adapted to be brought into engagement with the outer diaphragm as the pressure increases, while the outer diaphragm responds only to higher pressure, an indicating device, and means for connecting the same in operative relation to the inner diaphragm.

3. In a pressure gauge, a base member having means for attaching a pressure conduit thereto and also having an inner periphery, a pair of movable diaphragms which at lower pressures are separated except at their peripheries which are fitted within the inner periphery of the base so as to form a compression chamber therewith, the inner diaphragm being thin and deformed so as to give strength and to insure movement according to variation in pressure applied thereto without "snapping" and further adapted to engage at a predetermined pressure the outer diaphragm over a considerable part of the contacting surfaces of the two diaphragms, an indicating device, and means for connecting the same in operative relation to the inner diaphragm.

4. In a pressure gauge, a base member having means for attaching a pressure conduit thereto, and also having an inner periphery, a pair of movable diaphragms which at lower pressures are separated except at their peripheries which are fitted within the inner periphery of the base so as to form a compression chamber therewith, the inner diaphragm being thin and having a plurality of concentrically arranged corrugations for the purposes specified and adapted to be brought into engagement with the outer diaphragm as the pressure increases the outer diaphragm being much thicker than the inner one and acting as a stop of large area for the inner diaphragm for the purpose specified, said outer diaphragm having a centrally-located opening and being responsive only to pressure greater than that required to bring the inner diaphragm against it, an indicating means and means for connecting the same into operative relation with the inner diaphragm via the opening in said outer diaphragm.

5. In a pressure gauge, a base member having means for attaching a pressure conduit thereto and also having an inner periphery, a pair of movable diaphragms which at lower pressures are separated but having their peripheries fitting and sealed within the inner periphery of the base forming a compression chamber therewith, the inner diaphragm being thin and deformed for the purposes specified and adapted to be brought into engagement with the outer diaphragm as the pressure increases, the outer diaphragm being much thicker than the inner one and acting as a stop therefor as and for the purpose specified and responsive to pressures above that required to bring the inner diaphragm into contact with it, a mounting plate carried on the base adjacent the outer diaphragm, an indicating device and means carried on the mounting plate for connecting said device in operative relation to the inner diaphragm, said outer diaphragm having an opening therein to permit said operative connection to be made with the inner diaphragm.

6. For a pressure gauge of the diaphragm type having indicating means operatively connected to the diaphragm to indicate pressure applied thereto; a compound diaphragm composed of two parts normally separated, the inner part being thin and responsive to relatively low pressures, while the outer part is much stiffer and only responsive to pressure above that required to move the inner part against the outer part, said parts being adapted to contact over considerable area when the thin part is moved to engage the stiffer part, said indicating means being operatively connected to the thin part of the diaphragm.

7. For a pressure gauge of the diaphragm type having indicating means operatively connected to the diaphragm to indicate pressure applied thereto; a compound diaphragm composed of relatively thick and thin members normally separated by a small distance, the inner member being the thin one and having its surface deformed for the purposes specified and responsive to relatively low pressure, and adapted to contact with the thick member over a considerable area when the upper limit of the low pressure range is reached, whereby the outer member acts as a stop for the thin member and then as a part of the movable diaphragm when the pressure goes above the upper limit of the low range of pressures.

8. In a pressure gauge, a base member having means for attaching a pressure conduit thereto, a pair of movable diaphragms which at lower pressures are separated over the greater portion of their areas but fastened to the base member so as to form a compression chamber therewith, the inner diaphragm being made thinner than the outer one and responsive to low pressure and adapted to be brought into engagement with the outer diaphragm as the pressure increases, while the outer diaphragm is thicker and responds only to higher pressure applied through the inner diaphragm and strong enough to withstand the ultimate pressure applied thereto by the machine with which it is adapted for use, an indicating device, and means for connecting the same in operative relation to the inner diaphragm.

In testimony whereof, I affix my signature.

CARL T. MASON.